United States Patent
Peng et al.

(10) Patent No.: US 7,299,204 B2
(45) Date of Patent: Nov. 20, 2007

(54) SYSTEM FOR WINNING INVESTMENT SELECTION USING COLLECTIVE INPUT AND WEIGHTED TRADING AND INVESTING

(76) Inventors: Karl Peng, 22714 Coachlight Cir., Taylor, MI (US) 48180; Jian Peng, 22714 Coachlight Cir., Taylor, MI (US) 48180

( * ) Notice: Subject to any disclaimer, the term of this patent is extended or adjusted under 35 U.S.C. 154(b) by 1290 days.

(21) Appl. No.: 09/850,528

(22) Filed: May 7, 2001

(65) Prior Publication Data

US 2002/0032630 A1 Mar. 14, 2002

(51) Int. Cl.
G06Q 40/00 (2006.01)
(52) U.S. Cl. ...................................... 705/36
(58) Field of Classification Search ................. 705/36, 705/36 R
See application file for complete search history.

(56) References Cited

U.S. PATENT DOCUMENTS

| | | | |
|---|---|---|---|
| 5,517,406 A | 5/1996 | Harris et al. |
| 5,563,783 A | 10/1996 | Stolfo et al. |
| 5,608,620 A | * 3/1997 | Lundgren ...................... 705/1 |
| 5,729,700 A | 3/1998 | Melnikoff |
| 5,758,097 A | 5/1998 | Debe et al. |
| 5,784,696 A | 7/1998 | Melnikoff |
| 5,802,499 A | 9/1998 | Sampson et al. |
| 5,806,048 A | 9/1998 | Kiron et al. |
| 5,809,483 A | 9/1998 | Broka et al. |
| 5,812,987 A | 9/1998 | Luskin et al. |
| 5,819,237 A | 10/1998 | Garman |
| 5,819,238 A | 10/1998 | Fernholz |
| 5,890,140 A | 3/1999 | Clark et al. |
| 5,893,079 A | 4/1999 | Cwenar |
| 5,915,209 A | 6/1999 | Lawrence |
| 5,918,218 A | 6/1999 | Harris et al. |
| 5,930,774 A | 7/1999 | Chennault |
| 5,940,810 A | 8/1999 | Traub et al. |
| 5,950,176 A | 9/1999 | Keiser et al. |
| 5,963,923 A | 10/1999 | Garber |
| 5,995,947 A | 11/1999 | Fraser et al. |
| 6,012,042 A | 1/2000 | Black et al. |
| 6,012,044 A | 1/2000 | Maggioncalda et al. |

(Continued)

OTHER PUBLICATIONS

McClave, J.T., Benson, P.G., and Sincich, T.; "Statistics for Business and Economics", Prentice-Hall, 1998, pp. 372-374 and 736-742 (from IDS).*

(Continued)

*Primary Examiner*—James A. Kramer
*Assistant Examiner*—Jennifer Liversedge
(74) *Attorney, Agent, or Firm*—Harness, Dickey & Pierce, PLC

(57) ABSTRACT

Members vote on which investments within an agreed upon list of investments they believe should be bought and sold. Members can be general members or experts. Records of each member's voting history are retained and compared against market data showing actual gains and losses associated with each investment. Members whose votes are consistent with actual performance (they made good selections) are given higher weights; members whose votes are inconsistent with actual performance (they made bad selections) are given lower weight. Investment assets are bought and sold based on the collective vote of the members. Members are rewarded for a good voting record by receiving an additional share of the incremental profit of the collective investment.

28 Claims, 10 Drawing Sheets

U.S. PATENT DOCUMENTS

| | | |
|---|---|---|
| 6,018,722 A | 1/2000 | Ray et al. |
| 6,029,146 A | 2/2000 | Hawkins et al. |
| 6,029,148 A | 2/2000 | Zurstrassen |
| 6,055,519 A | 4/2000 | Kennedy et al. |
| 6,058,379 A | 5/2000 | Odom et al. |
| 6,064,985 A | 5/2000 | Anderson |
| 6,069,628 A | 5/2000 | Farry et al. |
| 6,073,116 A | 6/2000 | Boyle |
| 6,078,905 A | 6/2000 | Pich-LeWinter |
| 6,088,685 A | 7/2000 | Kiron et al. |
| 6,105,005 A | 8/2000 | Fuhrer |
| 6,134,535 A | 10/2000 | Belzberg |
| 6,134,536 A | 10/2000 | Shepherd |
| 6,141,653 A | 10/2000 | Conklin et al. |
| 6,157,918 A | 12/2000 | Shepherd |
| 6,175,824 B1 * | 1/2001 | Breitzman et al. ........ 705/36 R |
| 6,243,688 B1 | 6/2001 | Kalina |
| 6,247,000 B1 | 6/2001 | Hawkins et al. |
| 6,317,728 B1 * | 11/2001 | Kane ........................ 705/36 R |

OTHER PUBLICATIONS

Hoffman, J., Rogelberg, S. "A guide to team incentive systems", Team Performance Management. Bradford: 1998. vol. 4, Iss. 1 (9 pages).*

Leckey, Andrew. Investor Groups Find Associating Pays Dividends. Chicago Tribune. Chicago, Ill.: May 22, 1999. (3 pages).*

Reddy, J.D.; "An Introduction to the Finite Element Method," McGraw-Hill Book Company, 1984, pp. 44-50 and 156-163.

Myers, S.C. and Brealey, R.A.; "Principles of Corporate Finance," McGraw-Hill, 2000, pp. 543-555.

McClave, J.T., Benson, P.G., and Sincich, T.; "Statistics for Business and Economics," Prentice-Hall, 1998, pp. 372-374 and 736-742.

* cited by examiner

SYSTEM FOR WINNING INVESTMENT SELECTION USING COLLECTIVE INPUT AND WEIGHTED TRADING AND INVESTING

BACKGROUND AND SUMMARY OF THE INVENTION

The present invention relates generally to an investment processing system for managing financial assets, and more particularly to an investment decision-making process using prior decision making information related to a group of individual investors.

Traditionally, individual investors have used investment brokers to invest in the security markets. Such brokers may provide individual investors with limited advice, however that advice often does not yield the desired investment returns. More recently, the Internet has allowed individual investors to make their own investment decisions through online brokerage firms. However, individual investment is difficult because the investor must wisely select stocks or investments to buy and sell from so many different securities in the stock markets. Additionally, the individual investor is exposed to higher risk because he or she does not have sufficient information about the stocks, or a thorough understanding of the markets, or the skills and knowledge to evaluate various investments from different industries and countries. As a result of these risks, some investors gain from their investment decisions while many other investors may lose, particularly in markets with volatile conditions.

In an effort to minimize risks in investment trading, some individual investors invest in mutual finds managed by investment professionals. Managed mutual fund investment purportedly reduces risks because the investment firm uses professionals to select diverse stocks based on such criteria as industry, economic conditions and risk potential. The fund managers have full responsibilities for managing and making trading decisions for the fund. Various fund managers have different research, financial knowledge and analytical skills. Accordingly, the returns for mutual funds vary depending on the fund managers. The individual investors, however, have minimal control over management of the funds. Thus, individuals investing capital in the mutual fund companies are disadvantaged. For example, the individual investor who possesses a good ability to select investments, but has no control over the management of the funds, will not utilize his or her decisions.

A collective trading system according to the invention creates an entirely new investment possibility for a group of individual investors to collectively and actively participate in an investment decision-making process which uses prior decision information to select investments or stocks. The stocks are bought or sold in the financial markets. Using the prior decision information of individual investors, the individual investors collectively select more winning stocks. Investors are more likely to get better returns with lower risks. The returns will benefit all participating investors and not just particular individual investors.

The collective trading system includes Weighted Winning Stock Selection (WWSS) coefficients which are used to represent historical decision information about past stock selection by member investors. The WWSS coefficients are then used to assist with future decisions and distribute related gains or losses which result from trading in the markets. The participating individual member investors in the system make decisions which are weighted according to each investor's historical performances in selecting stocks. In particular, past performances in decision making of stock selection are reflected in WWSS coefficients. For example, for individual participating investors who select more "winning" stocks which are traded and realize a profit, their WWSS coefficients will be greater than the WWSS coefficients of those individual investors who select less "winning" stocks. With greater WWSS coefficients, individual investors are rewarded more if their decisions select more winning stocks. WWSS coefficients provide rewarding incentives which encourage the participating investors in the system to enhance their knowledge and research abilities about companies and markets, and to develop a better understanding in financial investment such that decisions will result in improved returns for traded investments.

For a more complete understanding of the invention, its objects and advantages, refer to the following specification and to the accompanying drawings.

BRIEF DESCRIPTIONS OF THE DRAWINGS

DETAILED DESCRIPTION OF THE INVENTION

Figure 1:
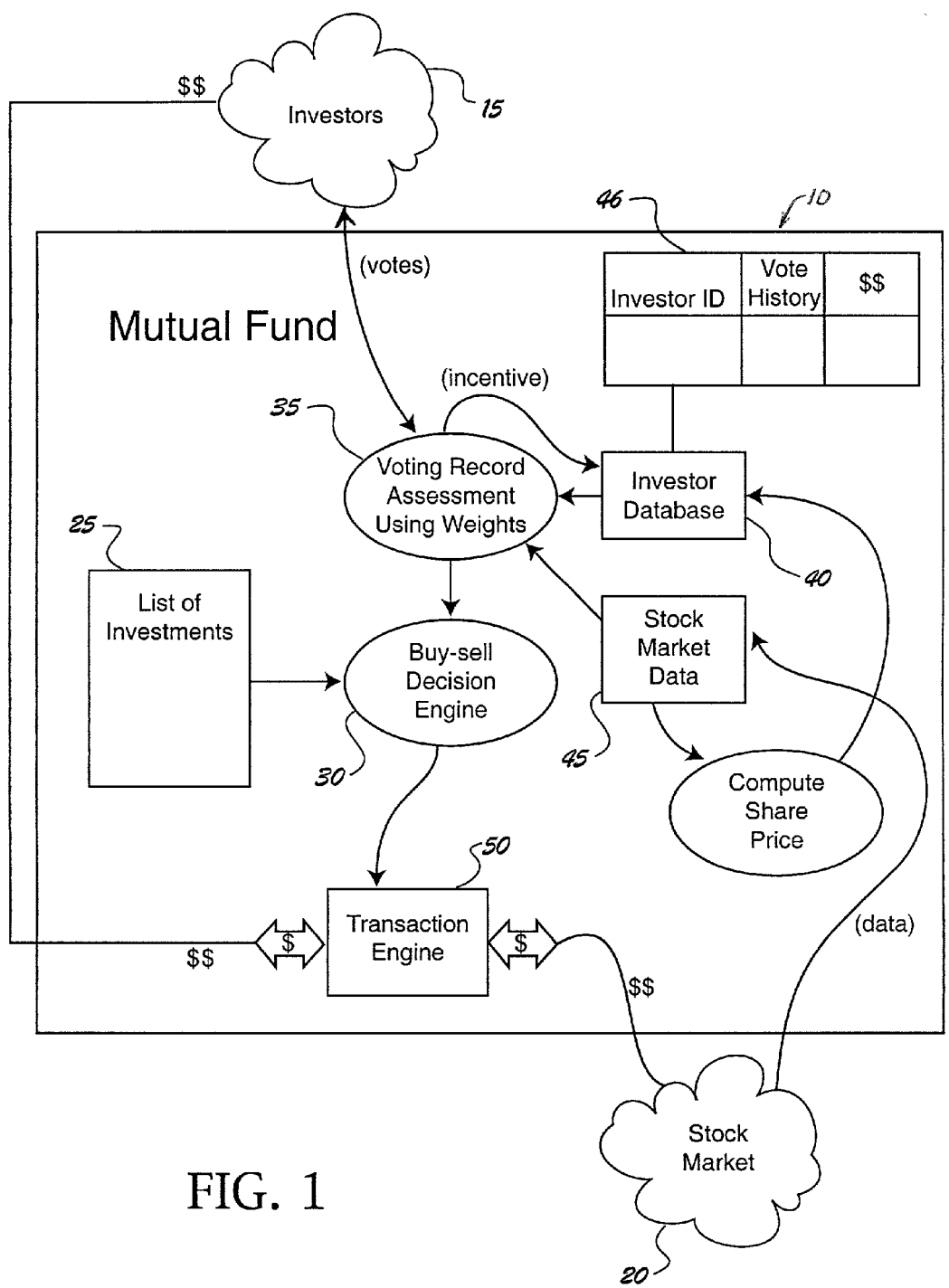
FIG. 1 is a flow chart diagram illustrating a presently preferred collective trading system.

Referring to FIG. 1, the collective investment trading system 10 is illustrated with investors 15 and stock market 20. Although a stock market is illustrated here, it will be understood that the invention may be applied to any asset buying and selling function. The collective investment trading system 10 allows investors 15 to execute investment decision regarding the stock market 20 in a unique manner by collectively managing trading of stocks or any other investments.

The collective investment trading system 10 includes a list of investments 25, a buy-sell decision engine 30, a voting records assessment engine 35, an investor database 40, a data store of stock market data 45, and a transaction engine 50. For a trading period in which a decision will be made for buying or selling stocks, the list of investments 25 is provided to the buy-sell engine 30. Investors 15 are able to vote on the stocks in the list of investments 25. In the preferred embodiment, the list of investments is a preselected group of stocks to which the investors 15 distribute their votes. The buy-sell decision engine 30 uses the votes and voting record assessments 35 to select which stocks are to be traded.

The voting records assessments 35 are based on prior vote history stored as part of the investor data 45 which indicates prior decisions made by each investor. The voting records assessments 35 may use other data such as, but not limited to, stock market data 45. For example, all votes which an investors cast for particular stocks during a trading period are represented in the vote history 46. The vote history is used to determine how well individual investors select stocks. If investors select stocks which are "winning" stock and provide an economic gain, then the voting record assessment will reflect such individual capability in making good decisions. If, however, investors select stocks which are "winning" stock and provide an economic loss, then the voting record assessment will reflect such a lack of individual capability in making good decisions.

The vote history 46, along with other data, is stored in investor database 40. The voting record assessment 35 provides a weighting to the votes. For example, the investor with a good vote history will have a larger voting record assessment, and the votes which he or she places on each stock will be increase by further weights. Comparably, the investor with a bad vote history will have a smaller voting record assessment, and the votes which he or she places on each stock will be decreased accordingly. The buy-sell engine 30 totals weighted votes for all stocks. The totals are provided to the transaction engine 50 which buys and sells the stocks based on the totals. If stocks are sold, then an economic gain may be realized and distributed to the investors 15 via the transaction engine. The distribution of money is determined using the voting record assessment as weights which distribute gains based on individual investor's voting capability, However, it should be appreciated that distribution may be performed by any appropriate manner.

Figure 2:
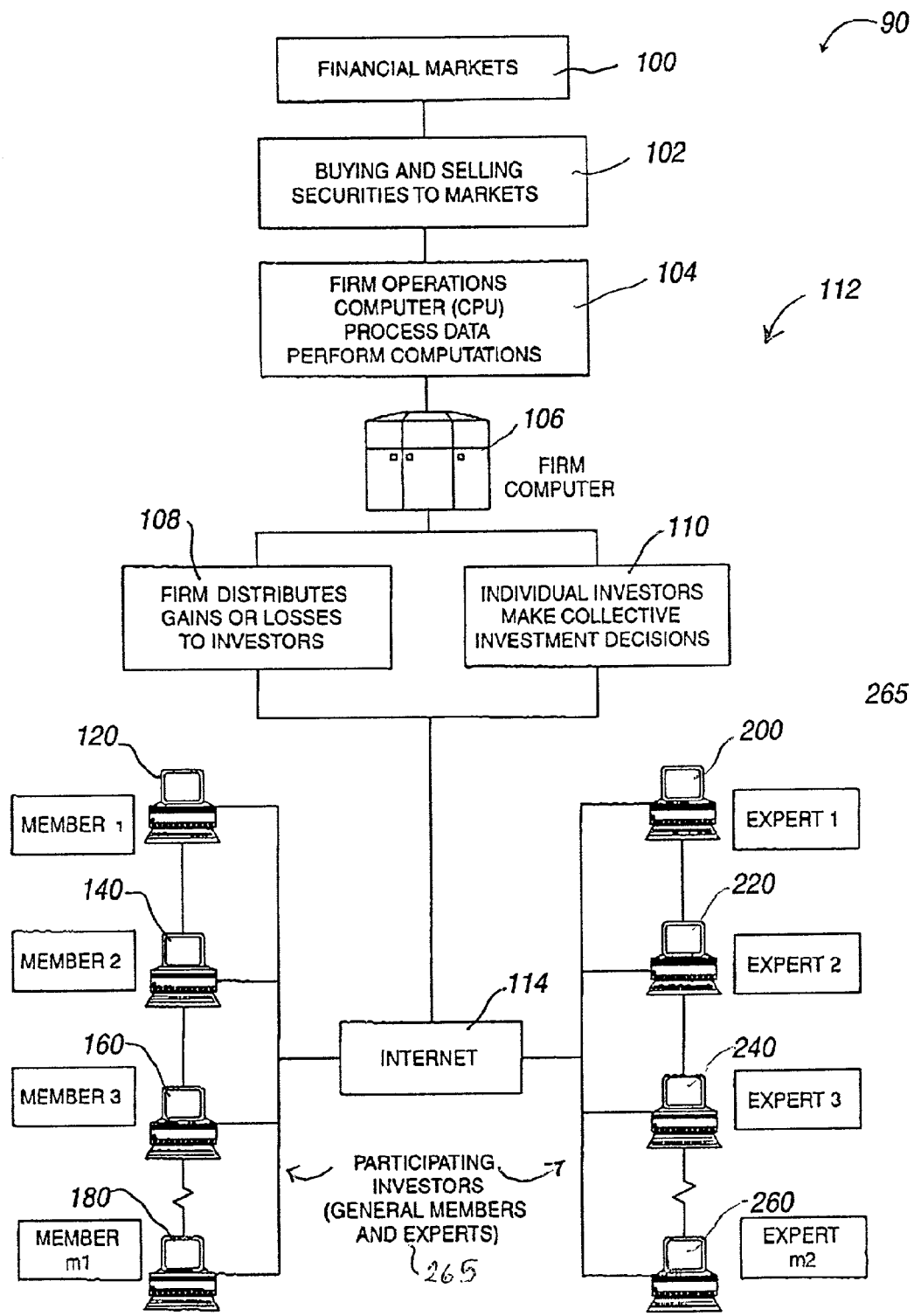
FIG. 2 is a block diagram of another embodiment of the presently preferred collective stock trading system.

Referring to FIG. 2, the further details of one embodiment of the collective investment trading system 90 are shown. Participating investors 265 communicate with the collective weighted winning stock selection trading system 112 via the Internet 114 or other suitable interface. The collective investment trading system 90 sends data to and receives data from financial markets 100. While Internet communicatioin is presently preferred, it should be appreciated that any suitable communication network or system may be used. The participating investors 265 may utilize a variety of systems including electronic devices 120, 140, 160, 180, 200, 220, 240 and 260, which collect and display data to users. It should be appreciated that any appropriate electronic device such as, but not limited to, a personal computer, wired or wireless device, may be used. In the exemplary embodiment, electronic devices 120, 140, 160 and 180 are associated with investors categorized as general members. Electronic devices 200, 220, 240 and 260 are associated with investors categorized as expert users. However, it should be appreciated that investors may be categorized by any criteria which is related to investing or decision making.

The total number of investors is N ($0<N=m_1+m_2$). There are $m_1$ general members ($0<m_1<N$) and $m_2$ expert users ($0<m_2<N$). The general members are investors who may lack credentials to distinguish them as experts. The experts are those investors who have the required expertise, educational training, or are professionals in stock markets, investments, or any other appropriate financially related discipline. General member 120 may become an expert if this member acquires sufficient knowledge and skills. It should be appreciated that investors may be classified into more than two groups depending on the particular application.

All investors, the general members and experts, collectively participate in the decision making process to trade stocks in the markets. This decision process is different from those methods that are currently used in traditional investment industry in that the traditional investment decisions are made by the individual investors who invest according to their own discretions by online brokerage firms, or by letting the mutual fund companies to invest for these investors in different funds.

The participating investors 265, using the electronic devices 120-260, send and receive information related to the investment decision to trading system 112 via the Internet 114. Accordingly, individual investors make collective investment decisions at block 110. An investment decision may be buying or selling of financial investments. Each one of the investors supplies votes to the firm computer 106. The votes are indicative of each investor's desire to buy or sell particular investments. The votes or individual decisions are used by the computer 106 to process data and perform computations at block 104. The individual decisions are weighted according to past decision history. Select investments or stocks are provided such that transactions of buying and selling securities occur at block 102. The transactions are executed in financial markets 100.

After trading the investments or stocks in the financial markets 100, an economic gain or loss may occur from the selling or buying of the stocks 102. For example, the selling of investments will yield a positive or negative return, whereas the purchasing of any investments will not provide a return. Accordingly, firm computer 106 processes data related to the selling or buying of investments at block 104 to produce gains or losses. Distribution of gains or losses to investors is performed at block 108.

In the preferred embodiment, trading system 112 utilizes voting decisions and gains or losses which are distributed according to each investor's past decision history which is represented by weighted winning stock selection (WWSS) coefficients. The WWSS coefficients in the collective investment trading system provide an incentive and encourage investors to proactively participate in the trading activities. Each investor's prior decisions in trading activities modify and update the value of WWSS coefficients. WWSS coefficients are then used to weight future voting decisions and/or gain/loss distributions. For example, the more stocks which yield a positive return or "winning" stocks which an investor selects, the individual investor's WWSS coefficient increases in value. As a result, investors with higher WWSS coefficients are given more effective decision power to vote and are rewarded because their votes are weighted with the WWSS coefficients.

WWSS coefficients also may be used to assure every investor gets some share of the gains related to trading of the stocks based on contributions to better decisions in the process of selecting "winning" stocks. This encourages all levels of investors to actively become involved in the investment trading system. In such a trading system, investing novices are not penalized because they have difficulty in selecting winning stocks. Rather, they are encouraged to collectively invest and become involved in the investment decisions. Once involved, investors will be more responsible to manage the mutual fund in which they invested.

Figure 3:
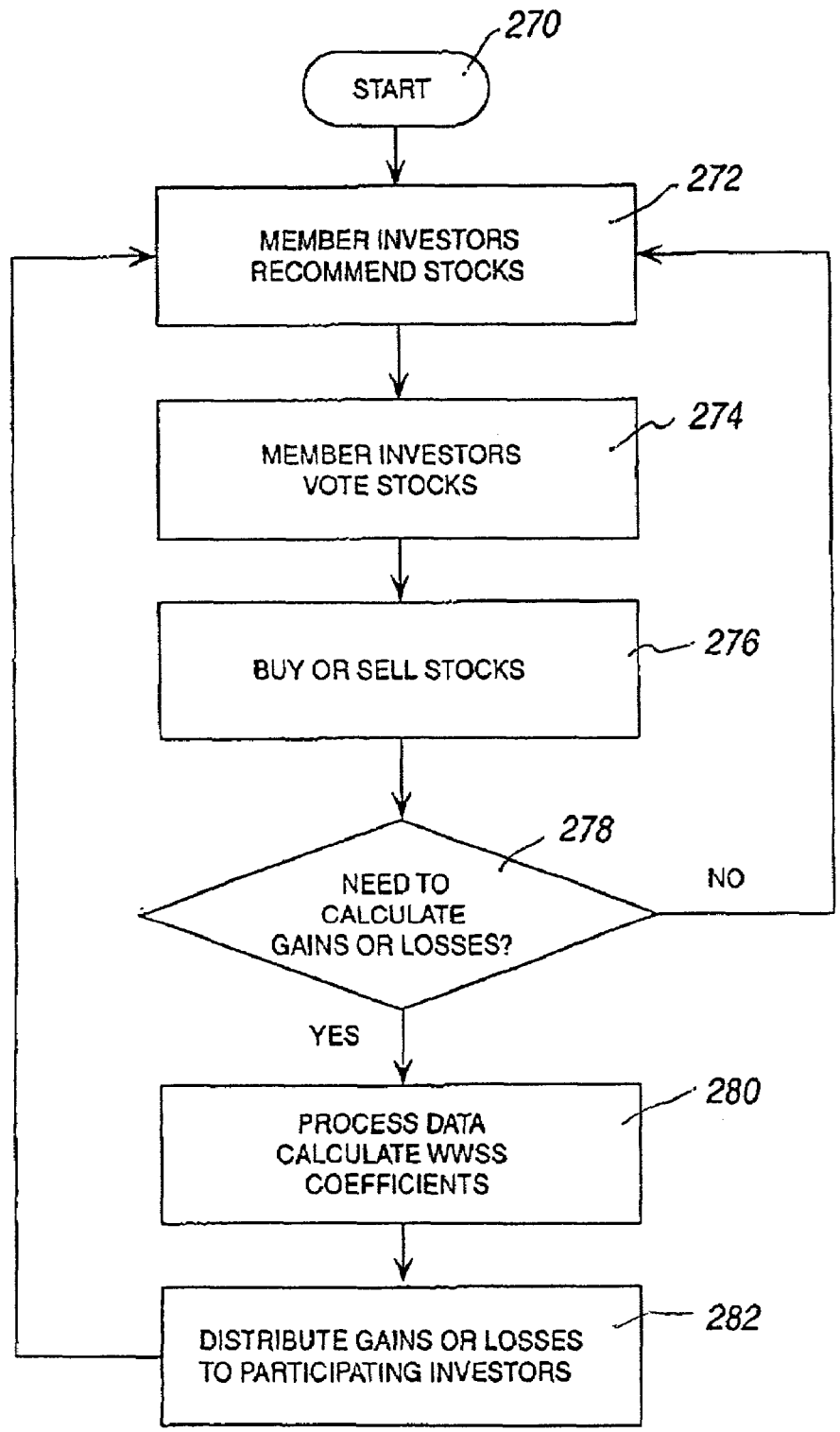
FIG. 3 is a flow diagram for the trading financial assets and distributing economic gains and losses using the system of FIG. 1.

Referring to FIG. 3, the method of collective decision making of investments begins at start block 270. For purposes of illustration, investments are stocks; however, it should be appreciated that any assets of value may be used, including, but not limited to, debts, equities, bonds, or any other merchandise/commodities that can be legally traded in any domestic or international markets. In the preferred embodiment, member investors recommend stocks at block 272. The recommended stocks are representative of possible stocks which may be provided to investors. The recommendation of stocks focuses investors to a particular group of stocks for which votes may be cast. For example, recommended stocks may provide a group of ten stocks which are presented to investors. In this manner, individual investors focus knowledge, research and decision making on the recommended stocks. Investors make decisions and vote the stocks at block 274. The voting is a weighted voting process based on prior voting history associated with the investors and represented by WWSS coefficients. For each recommended stock, the votes from individual investors are used to determine the total voting points.

Stocks with sufficient voting points are bought or sold at 276. For example, sufficient voting points may be assessed as higher than a predetermined minimum point amount specified by the system. After trading, an economic gain or loss may be calculated depending on whether stocks are bought or sold. A need to calculate gains or losses is determined at block 278. If there is no need to calculate gains or losses, a new collective decision making will begin at start block 270. If there is a need to calculate gains or losses, for example, if stocks are sold, then a distribution is determined and may be based on WWSS coefficients and processing data at block 280. Accordingly, gains or losses are distributed to participating investors at block 282.

Figure 4:
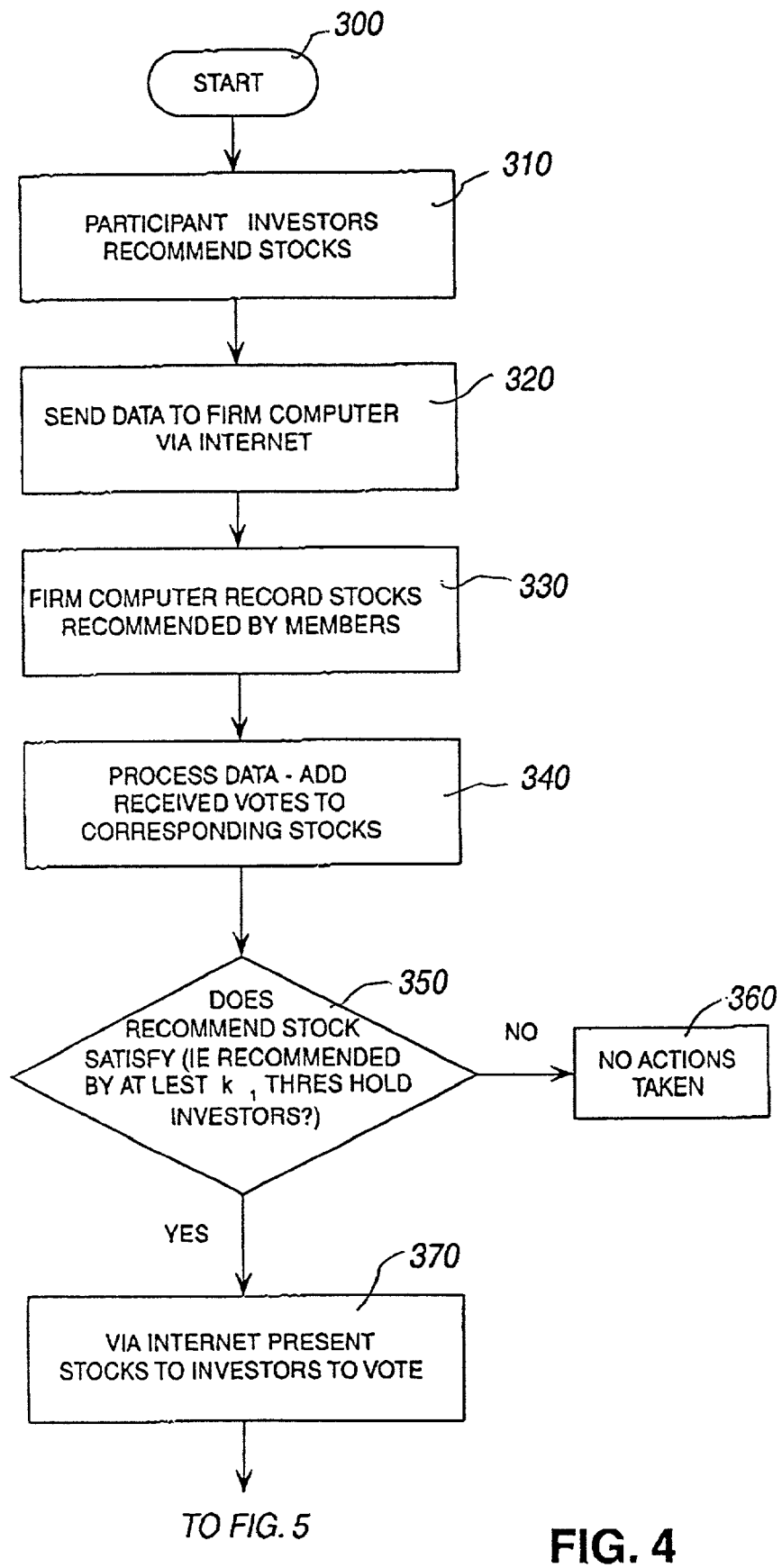
FIG. 4 is a flow diagram of the initial procedure to recommend stock to buy or sell.

Referring to FIG. 4, start block 300 initiates the method of participating investors selecting or voting stock. Through checking the financial market situations and the performances of the stocks in the markets, each investor may recommend stocks at block 310. For example, investors recommend buying stocks from all available stocks in the market, and recommend stocks for selling from the stocks that are currently owned by the mutual fund. The recommending time period may be minutes, hours or days, depending on predetermined rules of the investment trading system. The investors send data indicative of "recommended" stocks to the company's computer at block 320. The computer registers all "recommended" stocks received from the investors at block 330. After the recommendation period, the data is processed at block 340. The total number of recommendations is determined for each stock. A predetermined threshold which indicates the minimum number of investors required to recommend the stock may be set, for example, at least $k_1$ investors must recommend any particular stock. Whether the stock is recommended by at least the threshold $k_1$ of investors is determined at block 350. If the threshold is not met, then no action is taken at block 360. If stock is recommended by at least the threshold number, then data is sent to member investors so that they may vote on recommended stocks at block 370. The threshold number $k_1$ avoids too many stocks being sent for member investors to vote, and therefore avoids a situation in which member investors are overwhelmed and votes are not optimally used to select stocks.

Figure 5:
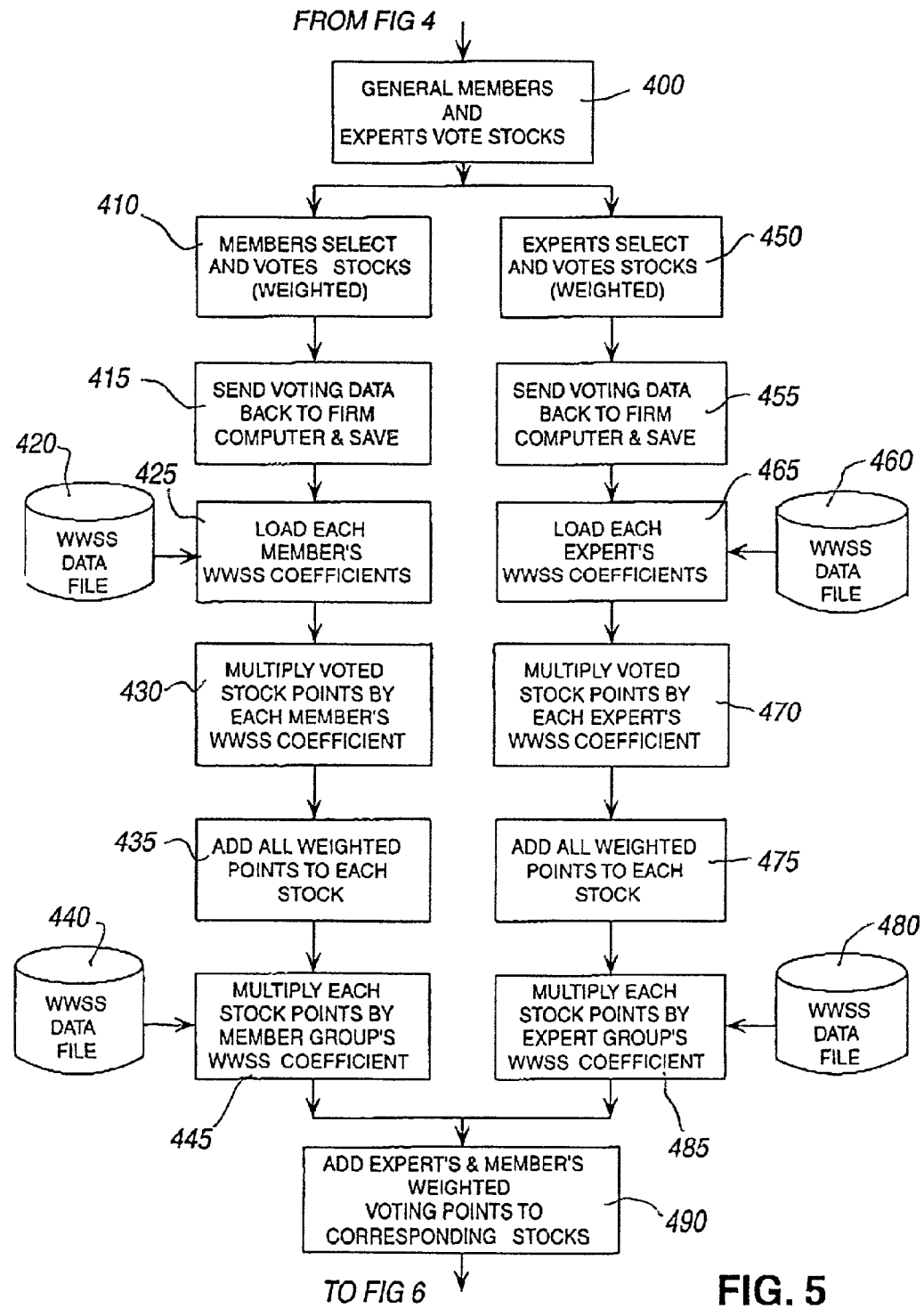
FIG. 5 is a flow chart diagram illustrating a method for collective financial decision making using weighted coefficients.

Referring to FIG. 5, investor members vote the recommended stocks at block 400 for trading. In the exemplary embodiment, investor members are categorized into members and experts since the general members and experts have different perspectives of the stocks to be sold or bought. In more complex investing processes, these investor members may be classified into more than two categories, and in less complex investing processes, investor members may be classified into a single category.

Accordingly, members vote stocks at block 410 and experts vote stocks at block 450. For the investors, each may access the list of the stocks that have been recommended. Each investor, member or expert is provided with a predetermined amount of points which are available for voting the recommended stocks. Points may be provided in an amount such that votes may be distributed to the stocks in a flexible manner. For example, each general member may be given 100 points to vote. The general member may "weight" his or her votes to different stocks. For example, if there are ten recommended stocks upon which a general member may cast votes, then of the ten recommended stocks, the votes may be distributed as follows:

| | |
|---|---|
| Stock 1 | 30 votes |
| Stock 2 | 25 votes |
| Stock 3 | 10 votes |
| Stock 4 | 5 votes |
| Stock 5 | 5 votes |
| Stock 6 | 5 votes |
| Stock 7 | 5 votes |
| Stock 8 | 5 votes |
| Stock 9 | 5 votes |
| Stock 10 | 5 votes |
| | 100 votes | thus, the votes for each stock are "weighted." According to each investor's expectation that a stock's value will increase or decrease, the investor may weight more votes to his or her preferred stocks by directing more points on particularly preferred stocks. Restrictions may be imposed on the maximum or minimum points that an investor may vote on an individual stock. For example, the minimum voting points can be as few as 5 points, and the maximum point as many as 50 points. A participating member investor is given 100 points to vote. This member may vote all the recommended stocks, Stock A with 5 points, Stock B with 10 points, Stock C with 10 points, Stock D with 50 points, and Stock E with 25 points. Alternatively, an investor may choose to not vote for all the stocks, for example, 2 stocks, each with 50 points, or vote as many as 20 stocks, each with 5 points. The distribution of votes depends on how an investor adjusts voting points to the stocks. Once the trading period available to vote terminates, based on time or other appropriate criteria, then the data is transmitted to the computer system and is saved at block 415 and block 455.

All the investors' voting data may be saved in a database or WWSS coefficient data file 420 and 460. The WWSS coefficient data file 420 and 460 also provide each investor's WWSS coefficient at blocks 425 and 465. A decision is determined based on WWSS coefficients and voted stock points. The system adjusts each participating investor's voting points by WWSS coefficients at blocks 430 and 470. Accordingly, investors' voting points are "weighted" according to the success of prior voting records. For example, participating investors who voted for more "winning" stocks have larger WWSS coefficients than participating investors who voted for less "winning stocks." The relative amounts of "winning" stocks may be based on a percentage manner, on a larger net gain of stocks, or any other appropriate evaluation criteria.

The differences among the WWSS coefficients of participating investors provide successful management of the stocks of the mutual fund. Since the WWSS coefficients are calculated by past voting history, the more winning stocks an investor selects, the larger his or her WWSS coefficient is valued, and thus the investor possesses more effective decision power compared to other investing members. This motivates participating investors to successfully manage the stocks by encouraging good decisions which select "winning" stocks. WWSS coefficients are optimal for making decisions based on investors with prior history of success in selecting the "winning" stock and provide better future predictions of selecting "winning" stock. WWSS coefficients also avoid mistakes that may be made by each individual investor because decisions are considered by more than one who may otherwise easily make a mistake.

In the exemplary embodiment, all weighted votes or points are summed for each stock at blocks 435 and 475. Further weighting based on past performance may be used. Group WWSS coefficients unique for each group are determined. For example, general member group's performances and expert group's performances in the voting process are used to determine a group WWSS coefficient for each. In the exemplary embodiment, the weighted stock points for each investor are adjusted by a group WWSS coefficient of the investor's association at blocks 445 and 485. For example, if the investor is an expert, then the expert WWSS coefficient is used. Also, if the experts' voting records of the winning stock are better than that of the general members' voting records, then the expert group's WWSS coefficient is greater than that of the general member group's WWSS coefficient. Weighting more for the group that has a better prior history of selecting "winning" stocks provides an additional methodology in selecting financial investments. WWSS group coefficients may be stored and are retrieved from the WWSS data file 440 and 480.

Figure 6:
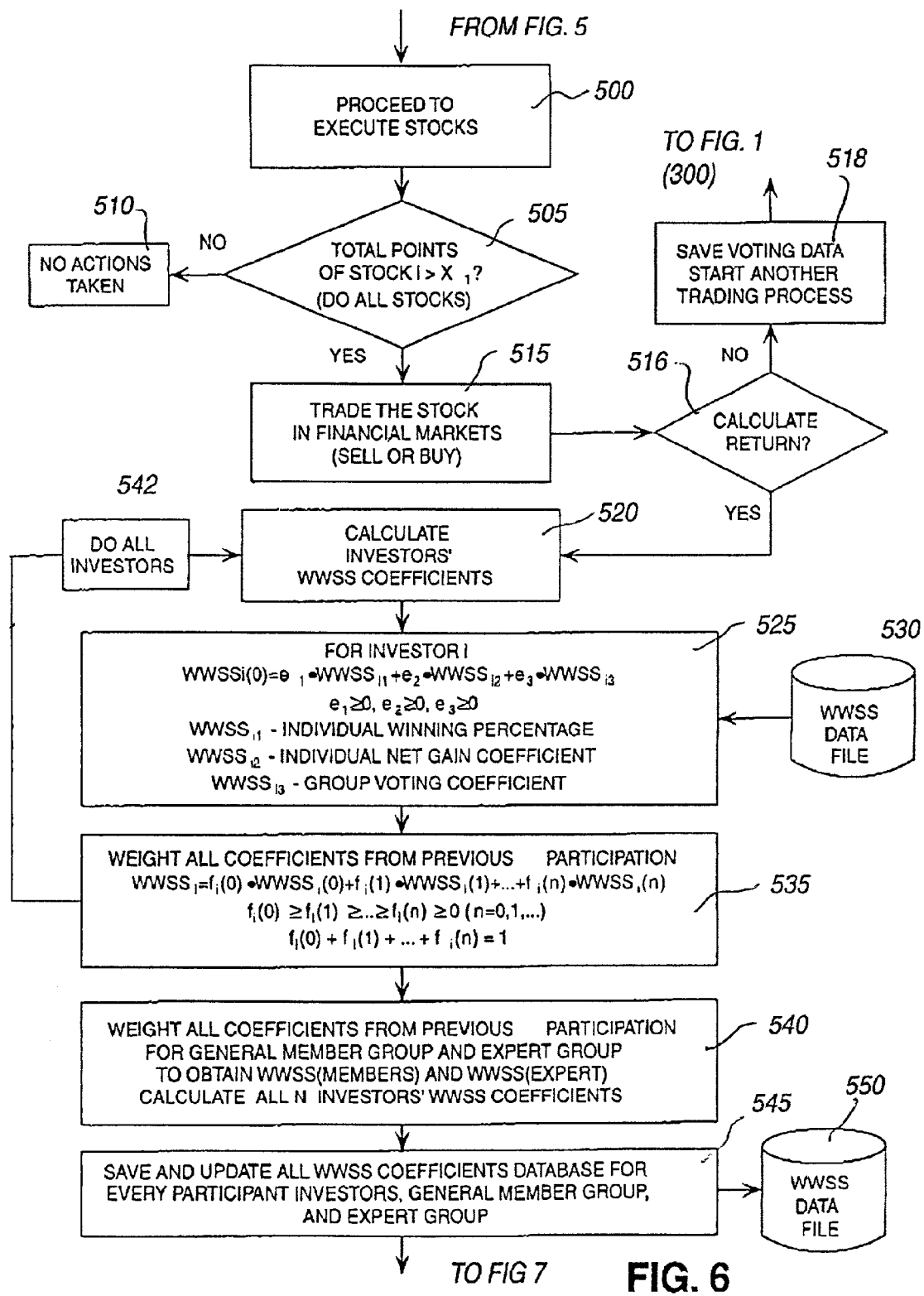
FIG. 6 is a flow chart diagram illustrating a method for trading based on the collective financial decision making method of FIG. 5 and a method for updating the weighted coefficients.

The completion of weighting voting points for all individual investors, and any group weighting (the general member group and the expert group) allows the computer to add all the weighted voting points for each stock at block 490. A list of stocks and the associated total voting points received by all the participating investors is produced. Referring now to FIG. 6, the decision to buy or sell the stocks is executed at block 500. In the exemplary embodiment, a threshold value $X_1$ is determined. A decision whether an action is to take to trade this stock or not is based on whether the total points of a stock is greater than a threshold a block 505. If a stock has total voting points less than or equal to $X_1$, then the stock is not to be traded at block 510. If a stock has voting points greater than $X_1$, then the stock is to be traded in the financial markets at block 515. It should be appreciated that any appropriate criteria may be used to determine if the stock is to be traded, such as, but not limited to, a relative ranking among all recommended stocks in a trade period. Whether to calculate a return is determined at block 516. If the trading of stocks does not require calculation of a return, for example, if all of the stocks were bought, then the voting data is saved and begins another trading process at block 518. The saved voting data is used in the calculations to update the WWSS coefficients. Another trading period starts at block 300. If the trading of stocks requires calculation of a return, then calculation of an updated investors' WWSS coefficients is executed at block 520. In the exemplary embodiment, each investor's updated or new WWSS coefficients is based on three determinations from block 530. Accordingly, as illustrated at 525 the WWSS coefficient for each investor is:

$$WWSS_i(0) = e_1 * WWSS_{i1} + e_2 * WWSS_{i2} + e_3 * WWSS_{i3}$$

where $WWSS_i(0)$ is the current weighted winning stock selection coefficient from the latest trading; $WWSS_{i1}$ is the individual weighted coefficient for winning percentage (for example, if a participating investor voted 8 of 10 stocks are winning stocks, they this investor's $WWSS_1$ is 0.8.); $WWSS_{i2}$ is the weighted coefficient for individual net gain from the trading of the stocks (if two investors have the same winning percentage in their stock selection, the net gains may be different; the larger the net gains, the greater the $WWSS_{i2}$); $WWSS_{i3}$ is the coefficient from the group's voting performance (if the participating investor is from the general member group, the general member's WWSS is used); $e_1$, $e_2$, and $e_3$ are weighted constants for the collective weighted winning stock selection coefficients $WWSS_{i1}$, $WWSS_{i2}$, and $WWSS_{i3}$ and may be predetermined by the collective trading system. For example, $e_1=0.75$, $e_2=0.15$, and $e_3=0.1$.

After obtaining the $WWSS_i(0)$ for each investor, the investors' updated $WWSS_i$ coefficients from previous participation in voting are determined. In the exemplary embodiment, $WWSS_i$ coefficients may be based on all previous trading actions, thereby depending on an investor's overall performance in the process. The number of prior trading actions used to calculate the $WWSS_i$ coefficients is denoted by n, a positive number specified by the trading system. For example, the system can specify n=1, 2 . . . or 100, etc., of trading periods, depending on the objective of the portfolio or on maximizing a possibility of selecting more winning stock. Therefore, the $WWSS_i$ is calculated by weighting all previous n WWSS coefficients that are calculated after each trading process at block 535 based on the following equation:

$$WWSS_i = f_i(0) * WWSS_i(0) + f_i(1) * WWSS_i(1) + \ldots + f_i(n) * WWSS_i(n),$$

where i=0, 1, . . . n are the trading periods the most recent prior trading period (0) to the least recent one (n) for an "effective action period." For example, assuming today is Mar. 10, 2000, the most recent trading date, if the system trades stocks once a day and counts six (6) trading days (assuming stock markets do not open on weekends) as the "effective action period" to compute the weighted winning stock selection coefficients, then i=0 is Mar. 10, 2000, i=1 is Mar. 9, 2000, . . . , and i=6 is Mar. 3, 2000. Also, $f_i(0)$, $f_i(1)$, . . . , and $f_i(6)$ are previous participation functions the weighted wining stock selection constants which correspond to the respect trading days. The calculation of the $WWSS_i$ coefficients for all the participating investors based on previous participation in voting is executed at block 542.

The previous participation functions may be selected in any appropriate manner. For example, the most recent previous participation functions are weighted more than functions associated with earlier trading periods. The previous participation functions may be calculated by any appropriate methods. For example, by the equation:

$$f_i(k) = |(n-k)/\Sigma(n-j)|; \quad (j=0, 1, 2, \ldots, n) \text{ or:}$$

$$\text{alternatively, } f_i(k) = (n-k)^2/\Sigma(n-j)^2; \quad (j=0, 1, 2, \ldots, n),$$

where $f_i(0) \geq f_i(1) \geq \ldots \geq f_i(n) \geq 0$ and $f_i(0) + f_i(1) + \ldots + f_i(n) = 1$ $(0 > n)$.

For example, if the collective weighted wining stock selection trading system uses 6 days as the effective trading action period, a set of previous participation functions may be chosen: $f_i(0)=0.333$, $f_i(1)=0.267$, $f_i(2)=0.200$, $f_i(3)=0.133$, $f_i(4)=0.067$, and $f_i(5)=0.000$ such that $0.333+0.267+0.200+0.133+0.067+0.000=1$.

In the exemplary embodiment, more recent previous participation functions yield a greater value than less recent previous participation functions, and thus provide a greater weight as more recent performance more accurately reflects the future performance of an investor in selecting the winning stocks. As investors in the trading system are involved in the learning and skill enhancement process, performances may improve, thus more heavily weighting recent coefficients also reflects this attribute. Each time a new coefficient is calculated and added to the records, the more recent coefficients are relied upon more than later coefficients. Therefore, there are n coefficients in the system for each individual investor. Alternatively, one or more of these n coefficients may be set to zero and therefore remove a term from the calculations the new coefficient WWSS.

In the exemplary embodiment, further weighting of WWSS coefficient may be implemented. General member group's WWSS coefficient and the expert group's WWSS coefficient are calculated at block 540. For the general member group:

$$WWSS_{GM}=f_{GM}(0)*WWSS_{GM}(0)+f_{GM}(1)*WWSS_{GM}(1)+\ldots+f_{GM}(n)*WWSS_{GM}(n),$$

where $f_{GM}(0) \geq f_{GM}(1) \geq \ldots \geq f_{GM}(n) \geq 0$; and $f_{GM}(0)+f_{GM}(1)+\ldots+f_{GM}(n)=1 (0<n)$.

For the expert group:

$$WWSS_{EX}=f_{EX}(0)*WWSS_{EX}(0)+f_{EX}(1)*WWSS_{EX}(1)+\ldots+f_{EX}(n)*WWSS_{EX}(n),$$

where $f_{EX}(0) \geq f_{EX}(1) \geq \ldots \geq f_{EX}(n) \geq 0$; and $f_{EX}(0)+f_{EX}(1)+\ldots+f_{EX}(n)=1 (0<n)$.

The WWSS coefficients for both the general member group and the expert group are more heavily weighted in the recent voting records than the past records because the recent records are more accurately reflect the subject's performance, and therefore have a better prediction to select more wining stocks in future's voting actions. The weighted constants may be determined by methods well known in the art.

After computing all the $WWSS_i$, $WWSS_{GM}$, and $WWSS_{EX}$ coefficients, the computer system updates the corresponding coefficients and is ready for next trading action. For example, $WWSS_i(n-1)$ is updated to $WWSS_i(n)$; $WWSS_i(n-2)$ is updated to $WWSS_i(n-1), \ldots$; $WWSS_i(1)$ is updated to $WWSS_i(2)$; and $WWSS_i(0)$ is updated to $WWSS_i(1)$. The WWSS coefficients are used in subsequent trading actions to determine a new $WWSS_i(0)$. Similar calculation updates for coefficients $WWSS_{GM}$ and $WWSS_{EX}$ are also performed. Thus, updated new sets of WWSS coefficients are available for the next round of trading action. The new WWSS coefficients are updated at block 545 in the database 550.

Figure 7:
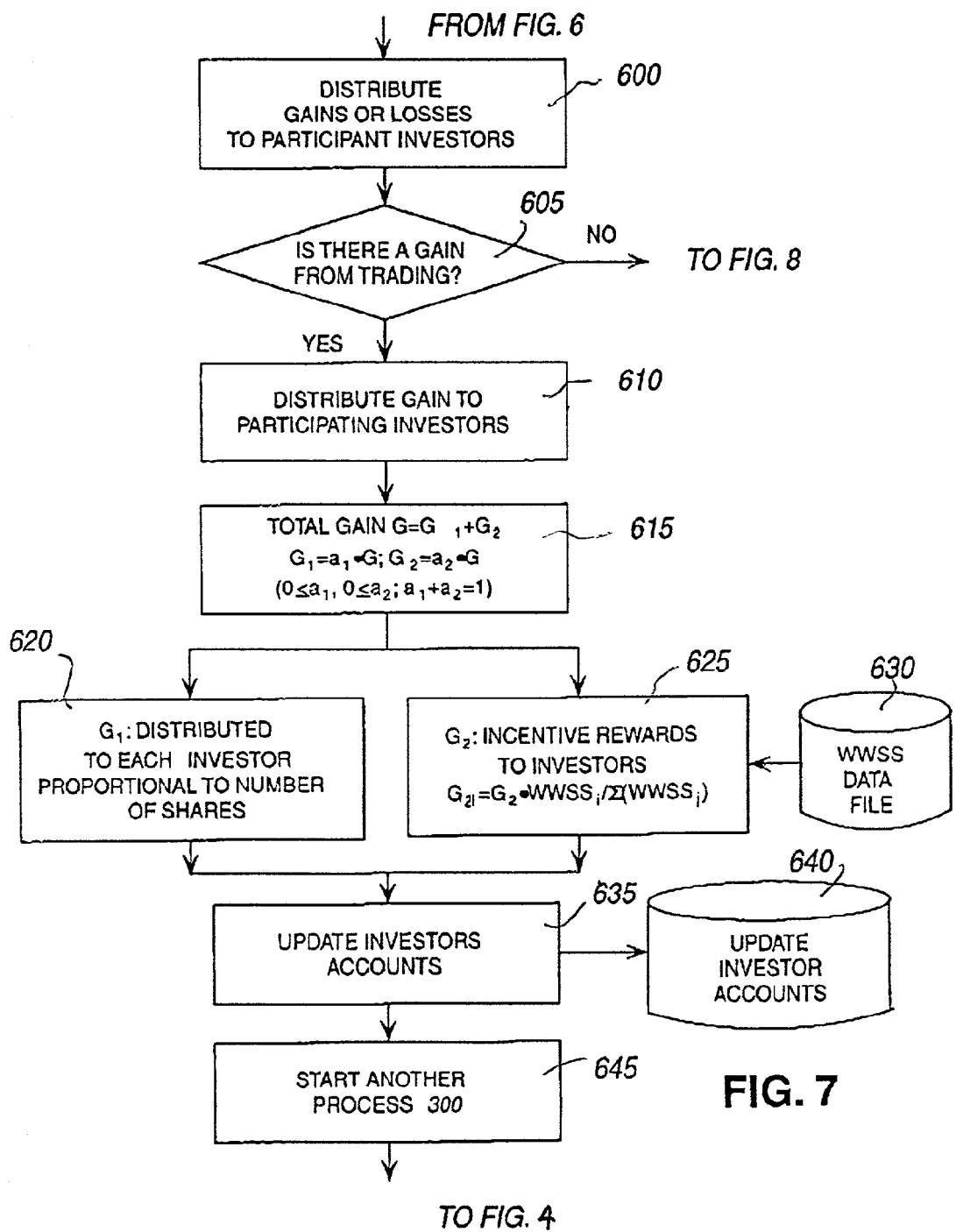
FIG. 7 is a flow chart diagram illustrating a method for distributing gains based on the collective financial decision making method of FIG. 5.

Referring to FIG. 7, the WWSS coefficients are used to distribute the gains or losses from the trading action at block 600. A determination of whether gains are available occurs at block 605. If there is a gain after trading the stocks, then the gain is distributed to participating investors at block 610. The distribution of the gain to the member investors is based on each individual investor's performance in selecting the winning stocks, and may additionally be based on the performance of each group either as a general member group or as an expert group. The total gain, illustrated at 615, is based on the equation:

$$G=G_1+G_2=a_1*G+a_2*G$$

where $G_1$ is the distribution provided to each individual based on the number of individually owned shares at block 620, and $G_2$ is the distribution provided to individuals based on prior voting history performance or WWSS coefficients at block 625. The distributed gains may be further determined by adjustment coefficients. The adjustment coefficients a1 and a2 may be predetermined based on an optimal distributed among the member investors. For example, $a_1=0.75$ and $a_2=0.25$. Accordingly, $G_1=a_1*G$ and $G_2=a_2*G$.

$G_1$ is the portion of gains that is distributed according to shares of stocks which each member investor owns (the investor's performance is not considered). This provides a minimal gain to member investors who did not select winning stocks. This encourages individuals to join the trading system. For example, if every share of stock gains two dollars from a trading period, and an investor owns 200 shares in the portfolio, then this investor receives $2\times200=\$400$. Thus, no matter how well or how poorly each investor does in voting, a distribution will be realized based on ownership of shares.

$G_2$ is the portion of gains that is distributed to the member investors according to each investor's performance in voting. It is proportional to the investor's WWSS coefficient which may be retrieved from WWSS data file 630. For example, if an investor has a larger WWSS coefficient, the investor receives a greater return than those with smaller WWSS coefficients according to the equation:

$$G2_i=G2*WWSS_i/Total\ (WWSS)$$

where $G2_i$ is the weighted gain for an individual investor, and $WWSS_i$ is this investor's individual weighted winning stock selection coefficient. Total (WWSS) is the total of all the participating investors' weighted winning stock selection coefficients and is determined according to the equation:

$$Total\ (WWSS)=\Sigma WWSS_j\ (j=1, 2, \ldots, N\ for\ the\ N\ investors).$$

The system updates each participating investor's account at block 635 with a new balance after each trading period. The new updates are stored in block 640. A new trading period then begins at block 645.

Figure 8:
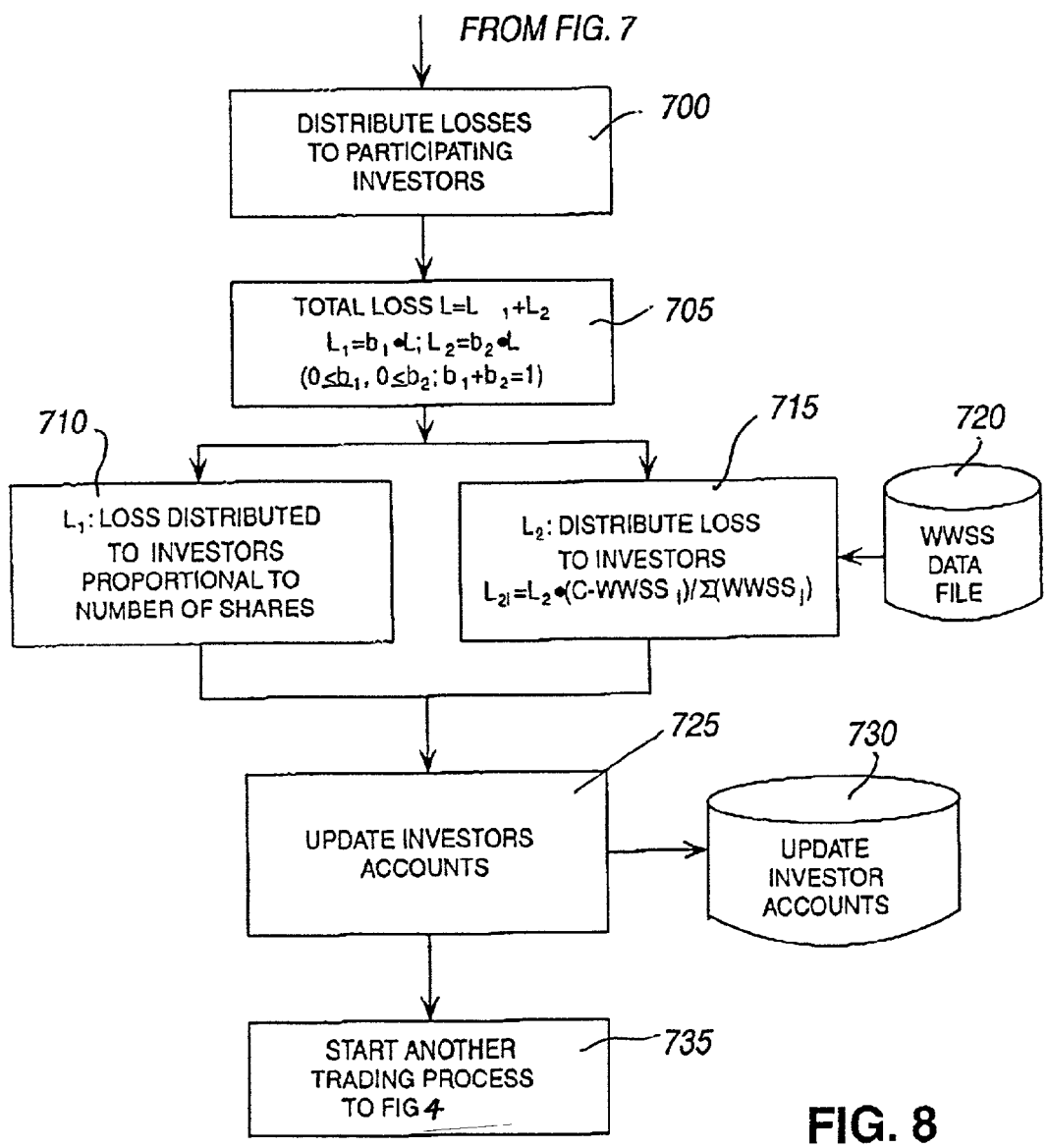
FIG. 8 is a flow chart diagram illustrating a method for distributing losses based on the collective financial decision making method of FIG. 5.

Referring to FIG. 8, distribution of losses may be needed if losses occur as a result of trading. In the exemplary embodiment, the loss is calculated at block 700 among these participating investors. The total loss is based on the equation:

$$Total\ loss\ L=L_1+L_2;\ L_1=b_1*L\ and\ L_2=b_2*L$$

at block 705, where $L_1$ is the portion of the loss which is distributed to participating investors based on the number of shares the investor owns and is determined at block 710. For example, if a one dollar loss per share occurs in the trading, and an investor has 100 shares, the investor realizes a one hundred dollar (\$1×100) loss from the trading. The loss is distributed to inventors based on the number of individually owned shares at block 710.

$L_2$ is the portion of loss which is distributed to participating investors according to WWSS coefficients and is determined at block 715. The WWSS coefficient may be obtained from 720. The distribution of the loss, however, is different from the distribution of a gain. In particular, in the distribution of a loss, investors with larger WWSS coefficients share less loss, and investors with smaller WWSS coefficients share more loss because the smaller WWSS coefficients are indicative that the individual did not have past successful performance in selecting the winning stocks. $L_2$ is distributed to each member investor according to the equation:

$$L_{2i}=L_2*(c-\text{WWSS}_i)/\text{Total (WWSS)},$$

where $\text{WWSS}_i$ is the individual investor's weighted winning stock selection coefficient. The constant c is a control number and may be predetermined by the system. For example c may be set so that a good stock selector will lose less and a bad stock selector will lose more. The loss is distributed to the participating investors and an update to participating investors' accounts 730 is executed at block 725. A new trading period may then begin at block 735. The total WWSS is the summation of all the participating investors' WWSS coefficients.

Figure 9:
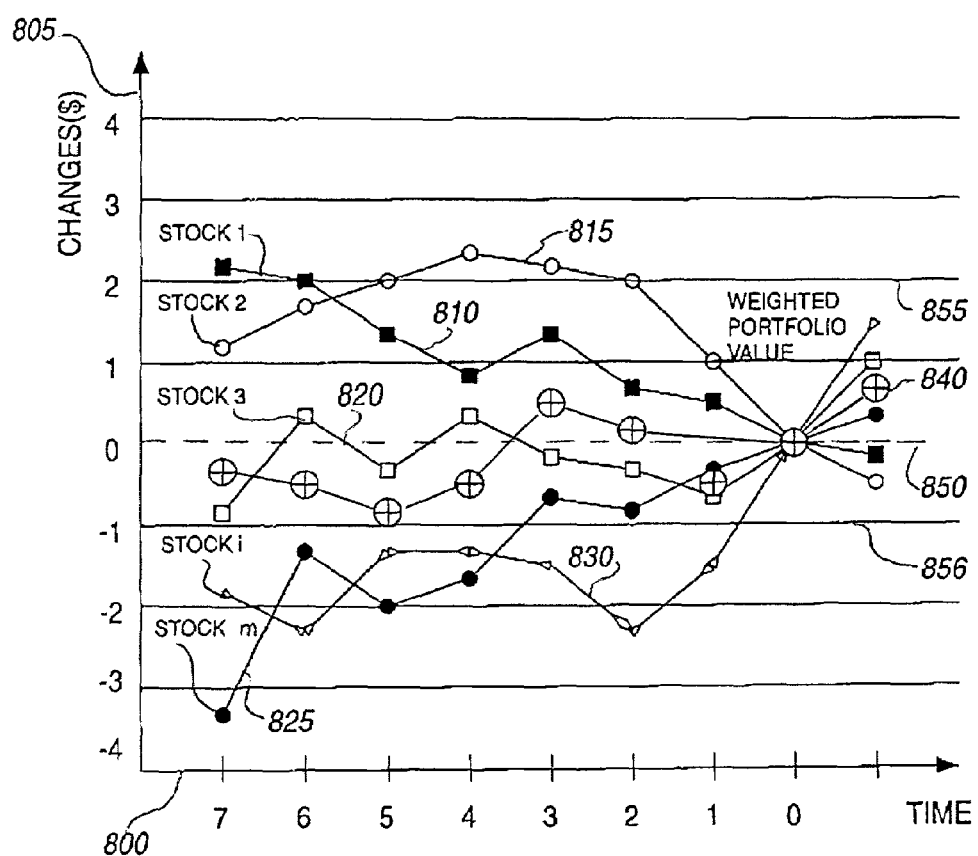
FIG. 9 is a chart illustrating portfolio performance monitoring and tracking process method based on the financial decision making method of FIG. 5.
Figure 10:
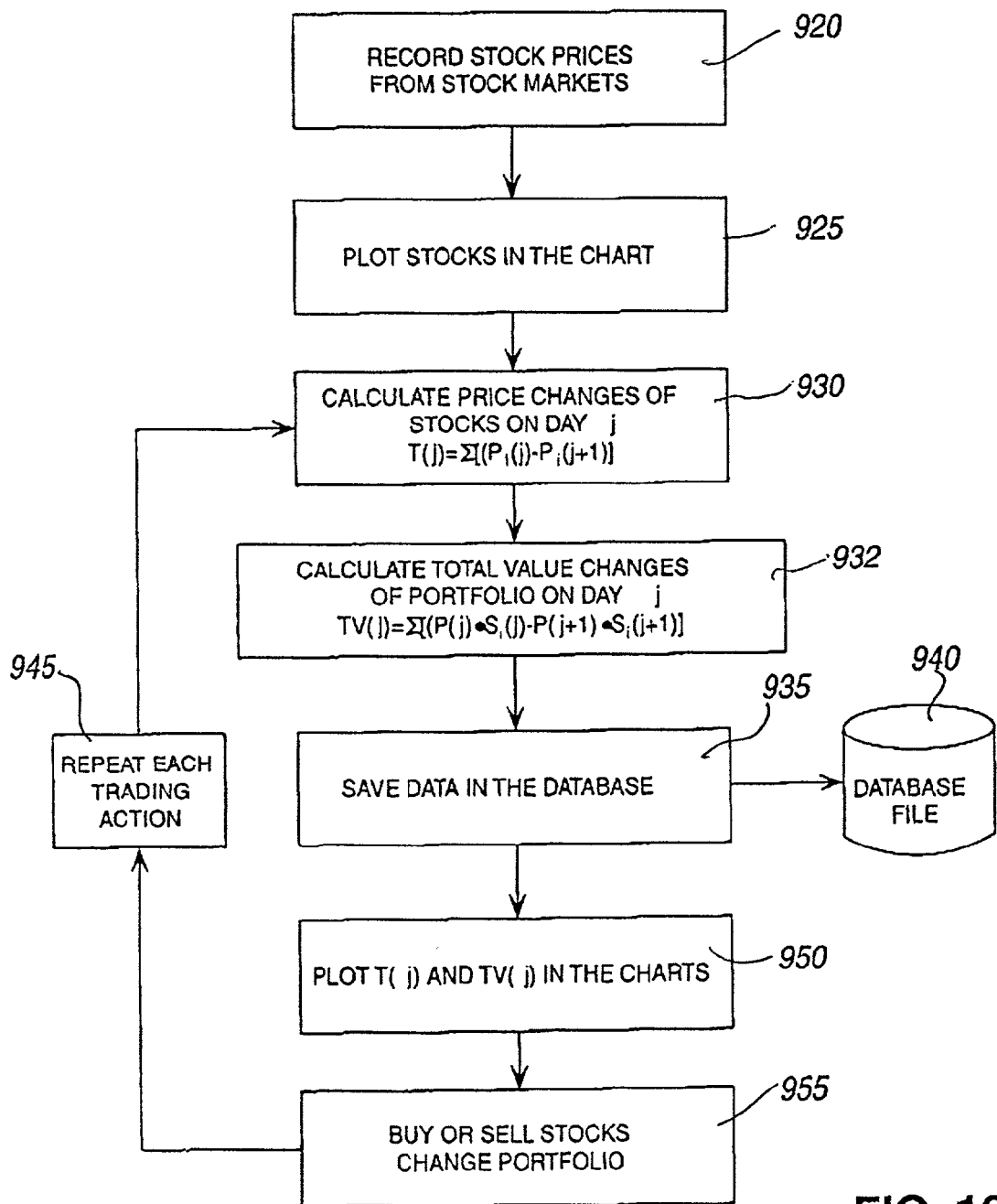
FIG. 10 is a flow diagram illustrating a system for monitoring fund performance.

Referring to FIG. 9, a tracking of changes in the value of the portfolio of the collective trading system is shown. The tracking indicates previous performances of the portfolio in which the stock's daily stock market closing prices are plotted in the chart. The chart provides investors in the collective trading system an understanding of the performance of the stocks in the mutual fund portfolio. The x-axis 800 indicates time based on trading periods. The most recent trading period is represented by the numeral 0. The y-axis 805 indicates changes of the prices of the stocks in the mutual fund portfolio. The trading actions are compared from the trend of stock performances. Line 850 indicates the position of the values of the displayed stocks at the last trading period. Line 855 indicates that the prices increased above the base line and line 856 indicates the prices decrease below the base line. For the purpose of illustration, only five stocks, Stock 810, Stock 815, Stock 820, Stock 825 and Stock 830, are plotted in the chart; however, it should be appreciated that any number of stocks in the mutual fund may be plotted. When new stocks are added to the system, the collective trading system automatically updates the calculating process and refreshes the chart. The new process will repeat after each trading period. Line 840 indicates the total daily changes of the value of the stocks in this portfolio. Referring to FIG. 10, the performance of the mutual funds is monitored by the collective trading system. Stock prices are recorded from the markets at block 920. The stock prices P(j) are recorded and displayed in a collective stock trading and monitoring chart at block 925. Price changes T(j) and TV(j) of the stocks are calculated at block 930 and 932, respectively, according to the equations:

$$T(j)=\Sigma[(P_i(j)-P_i(j+1)],$$

where (j) is the total change of the price of the stocks in the portfolio; j is the jth trading before the last trading; and j+1 is the trading before trading j; and $$TV(j)=\Sigma[P_i(j)*S_i(j)-P_i(j+1)*S_i(j+1)],$$

where the $P_i(j)$ and $P_i(j+1)$ are stock prices of the portfolio at the trading j and j+1; and S(j) and S(j+1) are the number of shares related to the stock. Updated data is saved in the database 940 at block 935. T(j) and TV(j) are plotted in the charts at block 950. The mutual fund portfolio is changed according to stocks bought or sold at block 955. The price changes are repeated after each trading action at block 945.

The foregoing system and method is thus able to maximize returns on financial investments while minimizing risks for a group of collective investors. While the invention has been described in its presently preferred embodiment, it will be understood that the invention is capable of modification without departing from the spirit of the invention as set forth in the appended claims. For example, the amount of past voting performance data used to weight current votes during a trading period can vary. Also, adjustment with weights may be selectively applied to votes during the decision making or distributions during sharing of economic gains or losses, rather than both.

What is claimed is:

1. A decision making system for selecting investment assets, comprising:
   a computer readable medium comprising:
   vote data received from a plurality of investors for representing desired selections related to the investment assets;
   a voting record assessment module for transforming the vote data into a voting expression which is representative of the users' prior abilities in selecting the item and current desires to select the item and adjusting the voting expression based upon winning weighted point functions and the vote data; and
   a buy-sell decision engine for providing a selection of investment assets based on the vote data and the adjusted voting expression.

2. The system of claim 1 wherein the vote data is weighted for each one of the investment assets.

3. The system of claim 1 wherein the investment assets are pre-selected.

4. The system of claim 1 wherein the voting expression includes weighting coefficients for adjusting the vote data.

5. The system of claim 1 further including a transaction engine for buying and selling investment assets based on the selection.

6. The system of claim 1 wherein the investment assets are associated with a mutual fund.

7. A method for selecting investments related to mutual fund transactions, comprising:
   receiving investment data which is representative of mutual fund transactions;
   receiving vote history data which is representative of prior votes received from a plurality of investors;
   transforming the vote history data into a voting record assessment expression;
   adjusting the voting record assessment expression based on the investment data; and
   providing a selection of the investments based on the adjusted voting record assessment expression.

8. The method of claim 7 wherein the voting record assessment expression is:

$$\text{WWSS}_i=f_i(0)*\text{WWSS}_i(0)+f_i(1)*\text{WWSS}_i(1)+\ldots+f_i(n)*\text{WWSS}_i(n)$$

wherein $\text{WWSS}_i(0), \ldots,$ and $\text{WWSS}_i(n)$ are trading period specific voting record assessments which each are associated with a trading period and $f_i(0), \ldots,$ and $f_i(n)$ are previous participation functions which are associated with the trading period and where $0 \ldots n$ represents each of the trading periods.

9. A method for collective financial decision making of an item among a group of users, comprising:
   receiving decision points values which are representative of selecting an item by each of the users, each of the decision points values are determined by the each of the users;
   transforming the decision points values into a voting expression which is representative of the users' prior abilities in selecting the item and current desires to select the item;

adjusting the voting expression based upon winning weighted point functions and the decision points values; and providing a selection of the item based on the adjusted voting expression.

10. The method of claim 9 wherein each of the winning weighted point functions are based on individual weighted coefficients related to winning percentages.

11. The method of claim 10 wherein the each of the winning weighted point functions are further based on weighted coefficients for individual net gain from the trading of the item and weighted coefficients for group's voting performance.

12. The method of claim 11 where prior compensation values and prior compensation amounts are representative from the same group of prior decisions.

13. The method of claim 11 wherein the time weighting coefficients are greater for adjusting winning percentages and compensation amounts which occurred more recently in time.

14. The method of claim 9 wherein the winning weighted point functions are based on:

$$WWSS_i = f_i(0)*WWSS_i(0) + f_i(1)*WWSS_i(1) + \ldots + f_i(n)*WWSS_i(n)$$

where $WWSS_i(0), \ldots,$ and $WWS\,S_i(n)$ are trading period specific weighted winning point functions which each are associated with a trading period, $f_i(0), \ldots,$ and $f_i(n)$ are previous participation functions which are associated with the trading period and where $0 \ldots n$ represents each of the trading periods.

15. The method of claim 14 wherein the trading period specific weighted winning point functions is based on:

$$WWSS_i(n) = e_1*WWSS_{i1} + e_2*WWSS_{i2} + e_3*WWSS_{i3}$$

wherein $WWSS_{i1}$ is the individual weighted coefficient for winning percentages, $WWSS_{i2}$ is the weighted coefficient representative of individual net gain from the trading of the stocks; $WWSS_{i3}$ is the weighted coefficient representative of group's voting performance, and $e_1$ $e_2$, and $e_3$ are weighted constants.

16. The method of claim 14 wherein the coefficient from the group's voting performance from the trading of the stocks is based on:

$$WWSS_{i3} = f_{i3}(0)*WWSS_{i3}(0) + f_{i3}(1)*WWSS_{i3}(1) + \ldots + f_{i3}(n)*WWSS_{i3}(n),$$

where $f_{i3}(0), \ldots, f_{i3}(n)$ are previous participation functions.

17. The coefficient of claim 9 wherein the selected item is sold.

18. The coefficient of claim 9 wherein the selected item is bought.

19. The coefficient of claim 9 wherein the item is selected from the group consisting of stocks, commodities and combinations thereof.

20. A method for allocating a predetermined financial distribution related to an item among a group of users, comprising:

receiving a predetermined compensation item for allocation, the predetermined item representative of financial value;

transforming the predetermined compensation item into a distribution expression which is representative of the users' prior selection abilities and current investment in the item; and adjusting the distribution expression based upon a weighted winning point function and the predetermined compensation item;

whereby the predetermined financial distribution is allocated based on the adjusted distribution expression;

whereby the users' prior selection abilities are exhibited in the users' decision performances in a predetermined prior trading period.

21. The method of claim 20 wherein each of the winning weighted point functions are based on individual weighted coefficients related to winning percentages whereby the winning percentages are adjusted to most recent performances of the users.

22. A method for allocating a predetermined financial distribution related to an item among a group of users, comprising:

receiving a predetermined compensation item for allocation, the predetermined item representative of financial value;

transforming the predetermined compensation item into a distribution expression which is representative of the users' prior selection abilities and current investment in the item; and adjusting the distribution expression based upon a weighted winning point function and the predetermined compensation item;

whereby the predetermined financial distribution is allocated based on the adjusted distribution expression;

wherein each of the winning weighted point functions are based on individual weighted coefficients related to winning percentages; and wherein the each of the winning weighted point functions are further based on weighted coefficients for individual net gain from the trading of the item and weighted coefficients for group's voting performance.

23. The method of claim 22 wherein the predetermined compensation values and predetermined compensation amounts are representative from a group of prior decisions.

24. The method of claim 22 wherein the weighted coefficients for individual net gain from the trading of the item and the weighted coefficients for group's voting performance which occurred more recently in time receive a greater weight.

25. A method for allocating a predetermined financial distribution related to an item among a group of users, comprising:

receiving a predetermined compensation item for allocation, the predetermined item representative of financial value;

transforming the predetermined compensation item into a distribution expression which is representative of the users' prior selection abilities and current investment in the item; and adjusting the distribution expression based upon a weighted winning point function and the predetermined compensation item;

whereby the predetermined financial distribution is allocated based on the adjusted distribution expression;

wherein the winning weighted point functions are based on:

$$WWSS_i = f_i(0)*WWSS_i(0) + f_i(1)*WWSS_i(1) + \ldots + f_i(n)*WWSS_i(n)$$

where $WWSS_i(0), \ldots,$ and $WWSS_i(n)$ are trading period specific weighted winning point functions which each are associated with a trading period and $f_i(0), \ldots,$ and $f_i(n)$ are previous participation functions which are associated with the trading period and where $0 \ldots n$ represents each of the trading periods.

26. A method for allocating a predetermined financial distribution related to an item among a group of users, comprising:

receiving a predetermined compensation item for allocation, the predetermined item representative of financial value;

transforming the predetermined compensation item into a distribution expression which is representative of the users' prior selection abilities and current investment in the item; and adjusting the distribution expression based upon a weighted winning point function and the predetermined compensation item;

whereby the predetermined financial distribution is allocated based on the adjusted distribution expression wherein the item allocation is an economic gain.

27. A method for allocating a predetermined financial distribution related to an item among a group of users, comprising:

receiving a predetermined compensation item for allocation, the predetermined item representative of financial value;

transforming the predetermined compensation item into a distribution expression which is representative of the users' prior selection abilities and current investment in the item; and adjusting the distribution expression based upon a weighted winning point function and the predetermined compensation item;

whereby the predetermined financial distribution is allocated based on the adjusted distribution expression wherein the item compensation allocation is an economic loss.

28. A method for allocating a predetermined financial distribution related to an item among a group of users, comprising:

receiving a predetermined compensation item for allocation, the predetermined item representative of financial value;

transforming the predetermined compensation item into a distribution expression which is representative of the users' prior selection abilities and current investment in the item; and adjusting the distribution expression based upon a weighted winning point function and the predetermined compensation item;

whereby the predetermined financial distribution is allocated based on the adjusted distribution expression and wherein the item is selected from the group consisting of stocks, commodities and combinations thereof.

\* \* \* \* \*